(12) United States Patent
Niiranen

(10) Patent No.: US 7,045,987 B2
(45) Date of Patent: May 16, 2006

(54) METHOD AND ARRANGEMENT IN CONNECTION WITH SLIP-RING MACHINE

(75) Inventor: Jouko Niiranen, Helsinki (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 10/971,156

(22) Filed: Oct. 25, 2004

(65) Prior Publication Data

US 2005/0083009 A1 Apr. 21, 2005

(30) Foreign Application Priority Data

Mar. 6, 2003 (FI) .................................. 20030342

(51) Int. Cl.
*H02P 1/16* (2006.01)
(52) U.S. Cl. ...................... 318/778; 318/786; 318/430
(58) Field of Classification Search ................ 318/778, 318/786, 430; 363/37
See application file for complete search history.

(56) References Cited

U.S. PATENT DOCUMENTS 3,683,251 A * 8/1972 Pisecker ...................... 363/37
6,448,735 B1 9/2002 Gokhale et al.

FOREIGN PATENT DOCUMENTS

| DE | 297 16 971 | 1/1998 |
|---|---|---|
| GB | 1076228 | 7/1967 |
| GB | 2 011 198 | 12/1978 |

* cited by examiner

*Primary Examiner*—Karen Masih
(74) *Attorney, Agent, or Firm*—Dykema Gossett PLLC

(57) ABSTRACT

An arrangement and a method for starting a slip-ring machine, the arrangement comprising a frequency converter arranged to be connected between a supply network and a rotor of the slip-ring machine for controlling the slip-ring machine, and starting means for starting the slip-ring machine. The starting means are arranged between the frequency converter and the rotor of the slip-ring machine, whereby the frequency converter is arranged to control the magnitude of the current of the rotor of the slip-ring machine in connection with starting the slip-ring machine.

5 Claims, 3 Drawing Sheets

INVERTER
RESISTANCE COUPLING

RECTIFIER INVERTER
AUTO TRANSFORMER
CROW-BAR CIRCUIT

METHOD AND ARRANGEMENT IN CONNECTION WITH SLIP-RING MACHINE

BACKGROUND OF THE INVENTION

The present invention relates to a method and arrangement for starting a slip-ring machine, the arrangement comprising a frequency converter arranged to be connected between a supply network and a rotor of the slip-ring machine for controlling the slip-ring machine, and starting means for starting the slip-ring machine.

The use of slip-ring machines has recently quickly become increasingly common in connection with high-powered drives in particular. Examples of such drives include wind generator drives and motor drives requiring a high torque. In a variable frequency use, slip-ring machines are typically controlled employing a "doubly-fed" principle. In such a manner of control, a stator of the machine is connected to a three-phase network whose frequency is constant. The network connected to the stator operates as a supply network when the slip-ring machine serves as a motor and, correspondingly, as a network to be supplied when the slip-ring machine serves as a generator.

In a doubly-fed use, the rotor of a machine is connected through slip rings to a frequency converter which is further connected to a supply network or to a network to be supplied. The frequency converter enables the rotor to be magnetized almost arbitrarily. A rotating magnetization to be provided for the rotor enables the operation of a doubly-fed machine to be controlled and its power and power factor to be set both in generator as well as in motor mode. A method of controlling a drive is disclosed in U.S. Pat. No. 6,448,735.

A frequency converter of a rotor circuit is dimensioned to operate typically within a speed range of approximately ±30% in the environment of a synchronous speed determined by the frequency of a network and the number of pole pairs of a machine. In the doubly-fed use, the greatest advantage is achieved in the inexpensiveness of the frequency converter equipment since its capacity is to be only about one fourth of the shaft power of the machine if the range of the controlled speed lies in the environment of the synchronous speed. When a controlled speed range lies ±30% from the synchronous speed, the frequency converter is only to supply approximately 100%×30%/(100%+30%) =23% of the shaft power of the machine at a maximum speed if the losses of the machine are ignored.

In connection with most applications, such as pumps and blowers, restricting the speed control is not a problem. A low rotation speed is used only during starting and stopping.

The fact that such doubly-fed slip-ring machines are difficult to start has prevented them from being largely used also in drives other than generator drives. When a machine is not running, the voltage induced into a rotor winding is about three times with respect to the rated voltage of a frequency converter to be connected to a rotor circuit, so the frequency converter cannot be connected directly to the rotor circuit. Previously this problem has been solved by using a starting resistor in the rotor circuit. The winding of a rotor is then provided with a resistive circuit through slip-rings. When the machine has accelerated close enough to the synchronous speed, the frequency converter may be connected to the rotor circuit and the resistors may be removed. FIG. 1 shows a prior art implementation of a starting arrangement for a slip-ring machine.

A problem with the resistor starting is a decrease in the torque of a motor as the motor accelerates. Therefore, the resistance of a rotor resistor is decreased usually by short-circuiting the starting resistor one part at a time. However, such a solution is complex, requiring numerous contactors which, in more high-power devices, are large and expensive. In addition, each short circuit causes a transient in the torque of the motor, which strains the rotating equipment.

BRIEF DESCRIPTION OF THE INVENTION

An object of the present invention is to provide an arrangement and a method for starting a slip-ring machine which avoid the aforementioned disadvantages and enable a slip-ring machine to be started in a more simple manner and with more inexpensive equipment. This object is achieved by the arrangement and method of the invention which are characterized by what has been disclosed in the characterizing parts of independent claims 1 and 5. Preferred embodiments of the invention are disclosed in the dependent claims.

The idea underlying the invention is that a slip-ring machine can be started controlled by a frequency converter when the magnitude of the voltage induced into a rotor of the slip-ring machine is taken into account during a start-up. This can be taken into account by decreasing the voltage of the rotor with respect to the voltage of the frequency converter, in which case controlling the voltage of the frequency converter enables the current of the rotor to be controlled.

An advantage of the solution of the invention is that the equipment necessary for start-up becomes simpler. In addition, the method and equipment of the invention enable the slip-ring machine to be controlled during a start-up and the electrical state thereof to be determined using a frequency converter and sensors thereof.

BRIEF DESCRIPTION OF THE DRAWINGS

The invention is now described in closer detail in connection with the preferred embodiments and with reference to the accompanying drawings, in which.

DETAILED DESCRIPTION OF THE INVENTION

Figure 1:
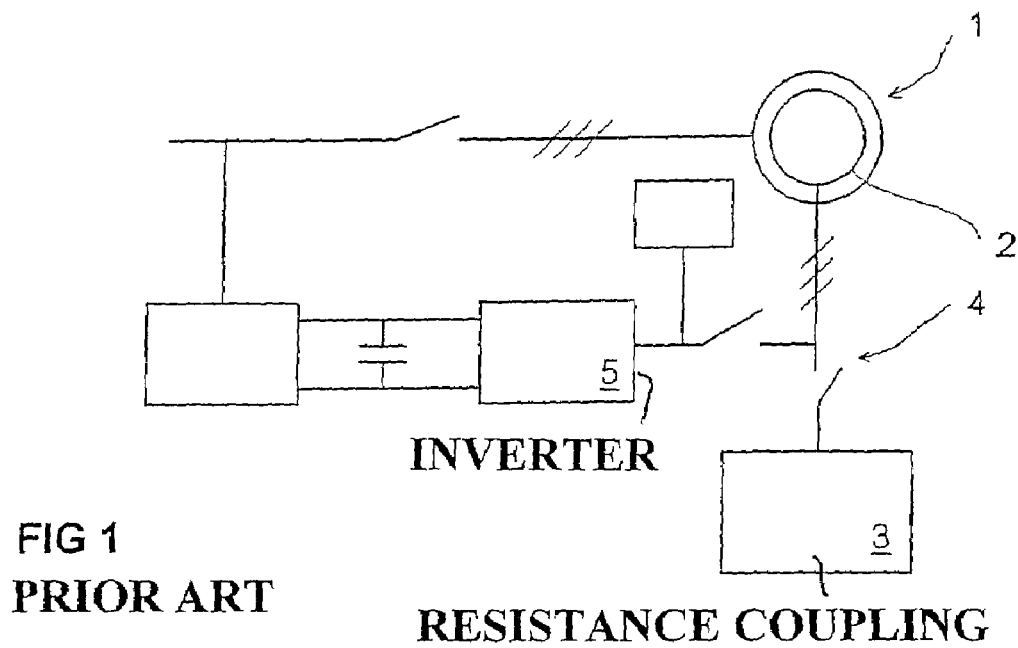
FIG. 1 shows a prior art implementation for starting a slip-ring machine.

FIG. 1 schematically shows prior art equipment. In this solution, a rotor 2 of a slip-ring machine 1 is provided with a resistance coupling 3 through slip rings. A resistance coupling typically includes star-connected resistors and contactors arranged to short-circuit these. In order to improve the operation during a start-up, the contactors are often implemented so as to enable the contactors to short-circuit a resistor one part at a time, and finally to short-circuit the resistor in its entirety.

After the machine has started, the resistance coupling 3 is separated from the rotor circuit 2 by a switch coupling 4, after which the rotor circuit is coupled to an inverter unit 5 of a frequency converter for normal use.

Figure 2:
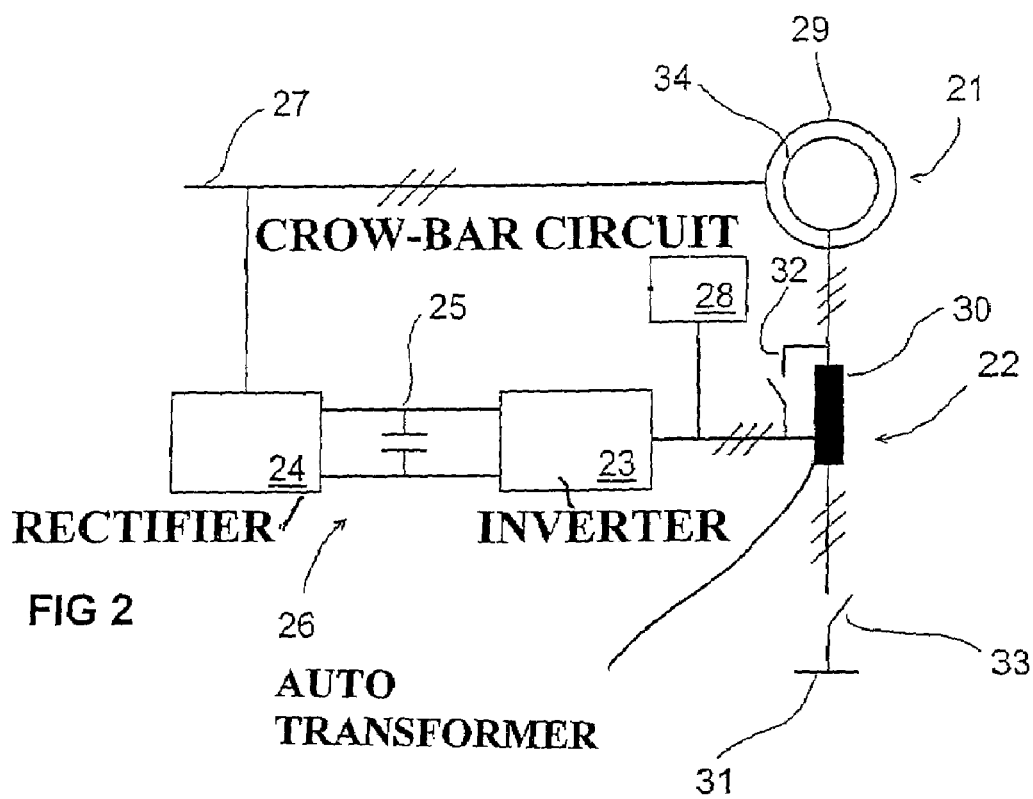
FIGS. 2 and 3 show equipment according to some embodiments of the invention, FIG. 4 schematically shows curve shapes of voltages as a function of the rotating speed of a machine in connection with a resistive starting equipment of the invention, and FIG. 5 schematically shows a curve shape of a torque and torque limits as a function of the rotating speed of a machine in connection with a resistive starting equipment of the invention.

The arrangement of the invention, one embodiment thereof being shown in FIG. 2, comprises a slip-ring machine 21 whose stator 29 is connected to a supply voltage 27 in a normal manner. The arrangement of the invention further includes starting means 22 arranged between an inverter unit 23 of a frequency converter and a rotor of the slip-ring machine. The frequency converter 26 is, at its rectification unit 24, connected to a supply network 27 in a normal manner. FIG. 2 also shows a DC intermediate circuit 25 which is to even out and store voltage for the inverter unit, and a "crow bar" circuit 28 which is to protect the equipment against overvoltages.

In the arrangement of the invention, the starting means are thus connected between the frequency converter and the rotor of the slip-ring machine, and the frequency converter is arranged to control the magnitude of current of the rotor of the slip-ring machine. The frequency converter may then be used for controlling the electrical quantities of the rotor in connection with a start-up and particularly also when the slip-ring machine operates as a motor.

According to a preferred embodiment of the invention, the starting means comprise a three-phase auto-transformer 30, first ends of primary windings thereof being coupled to phase outputs of the frequency converter and second ends of the primary windings thereof being coupled to a common star point 31 and tapping points of a secondary winding being coupled to a three-phase rotor circuit of the slip-ring machine. According to the embodiment, the starting means further comprise first coupling means 32 for connecting the first ends of the primary windings of the auto-transformer to first ends of the secondary windings, and second coupling means 33 for separating the phases of the auto-transformer from the common star point 31.

As is well known, an auto-transformer comprises only three separate terminals, i.e. one at both ends of a winding and one intermediate tapping point. The intermediate tapping point constitutes a first end of a primary winding. An end of the winding, again, constitutes a second end of the primary winding, and the same end of the winding also constitutes one end of a secondary. A first end of the winding constitutes a first end of the secondary. In the auto-transformer, there is thus provided a common terminal for the second ends of the primary and the secondary. The common terminals of the three-phase auto-transformer of the embodiment of the invention are thus coupled to star, i.e. to each other, through second coupling means.

The first ends of the primary winding of the embodiment of the invention are coupled to the phases of an output of the frequency converter, i.e. to the inverter unit 23 of the frequency converter. The first ends of the secondary are coupled directly to a rotor 34 of the machine through slip rings. According to the embodiment, the first coupling means 32 enable the auto-transformer to be passed in its entirety since these coupling means are capable of short-circuiting the first ends of the primary and the secondary. After these ends have been short-circuited, the output of the frequency converter is coupled directly to the slip rings and thus to the rotor circuit of the machine.

According to the method of the invention, in connection with the above-described embodiment the slip-ring machine is started such that first, the first coupling means 32 are in a non-conductive state while second coupling means 33 are in a conductive state. In such a case, in a start-up situation the voltage to be induced into the rotor of the machine is decreased through a transformer. A transformation ratio of the auto-transformer is selected such that the voltage of the output of the frequency converter is in the order of the voltage induced when the transformation ratio is taken into account. The frequency converter may thus be used for producing voltage by means of a transformer enabling the current flowing in a rotor circuit during a start-up to be controlled. After the motor has been accelerated to a normal doubly-fed operation range, the states of the coupling means are changed, i.e. the star point of the auto-transformer is opened and the primary and the secondary are short-circuited. The motor has thus been brought to operate in a normal manner by continuously controlling the electrical state of the rotor.

Figure 3:
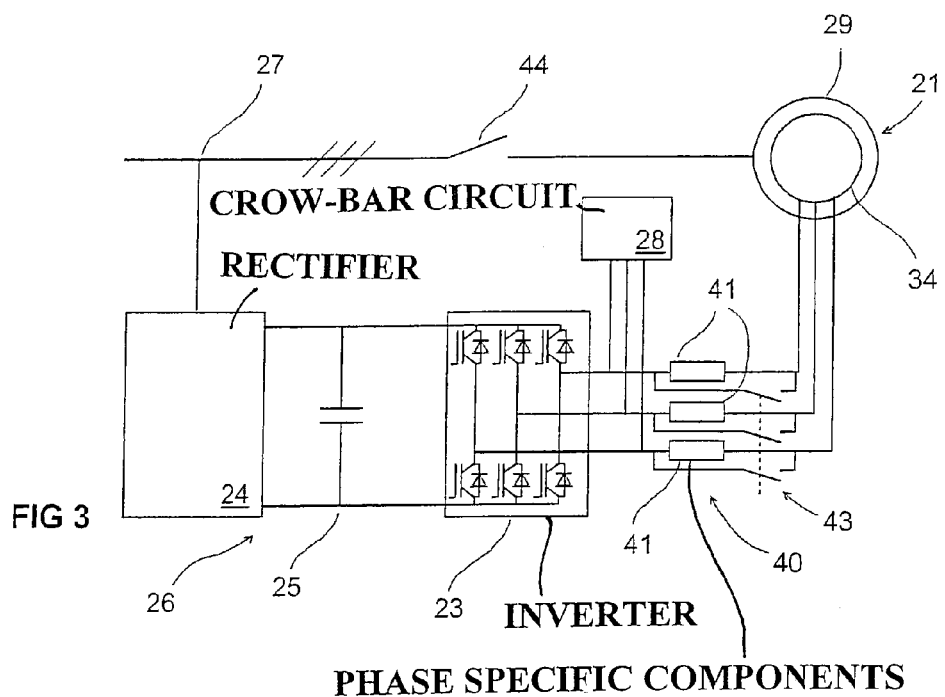

FIG. 3 shows an arrangement according to a second embodiment of the invention. In this arrangement, starting means 40 comprise phase-specific components 41, i.e. for instance resistors or series connections formed by a resistor and a choke, which are coupled between an output of a frequency converter and a rotor 34 of a slip-ring machine. The starting means further comprise coupling means 43 for short-circuiting the components 41 so that the coupling means enable the series connections to be passed after the slip-ring machine has accelerated to the necessary speed. In such a case, during a start-up, between the output of the frequency converter and the rotor of the slip-ring machine, impedances are coupled that are passed by means of switch means in order to direct-couple the frequency converter and a rotor circuit during a normal doubly-fed use. According to a preferred embodiment of the invention, the coupling means 43 are three-phase switches, so that they may be controlled as simultaneously as possible. The rest of the reference numbers shown in FIG. 3 represent details shown in connection with FIG. 2.

Such an arrangement enables the currents of the rotor circuit to be controlled by an inverter unit of the frequency converter also during a start-up. A frequency converter typically includes sensors that enable the currents and voltages of the frequency converter to be determined. When the arrangement of the invention is used during a start-up, the electrical state of the slip-ring machine to be controlled may thus be determined continuously. This enables a reliable and fast transfer to a normal use after the machine has accelerated since the frequency converter may be quickly adapted to a new state after the operation of the coupling means because the previous electrical state is known.

An embodiment of the arrangement of the invention based on series impedances 41 enables the currents of a machine to be controlled by changing the output voltage of a frequency converter in a rotor circuit e.g. on the basis of a current measured by sensors of the frequency converter. If, for example, the current is to be restricted to a particular constant value $\underline{I}$ during a start-up, the frequency converter is to produce a voltage $\underline{U}_{out}$ to realize an equation $\underline{U}_{out}=\underline{Z}\underline{I}-\underline{U}_{rot}$, where $\underline{Z}$ is the magnitude of series impedance and $\underline{U}_{rot}$ is the voltage induced into the rotor circuit. Selecting the magnitude of the impedance $\underline{Z}$ appropriately enables a current $\underline{I}$ to be controlled by means of the output voltage of the frequency converter. According to a preferred embodiment of the method of the invention, the current of the rotor circuit is controlled to be zero prior to coupling the coupling means. When the current is zero, the rotor circuit may be coupled directly to the output of the frequency converter in as simple a manner as possible.

Figure 4:
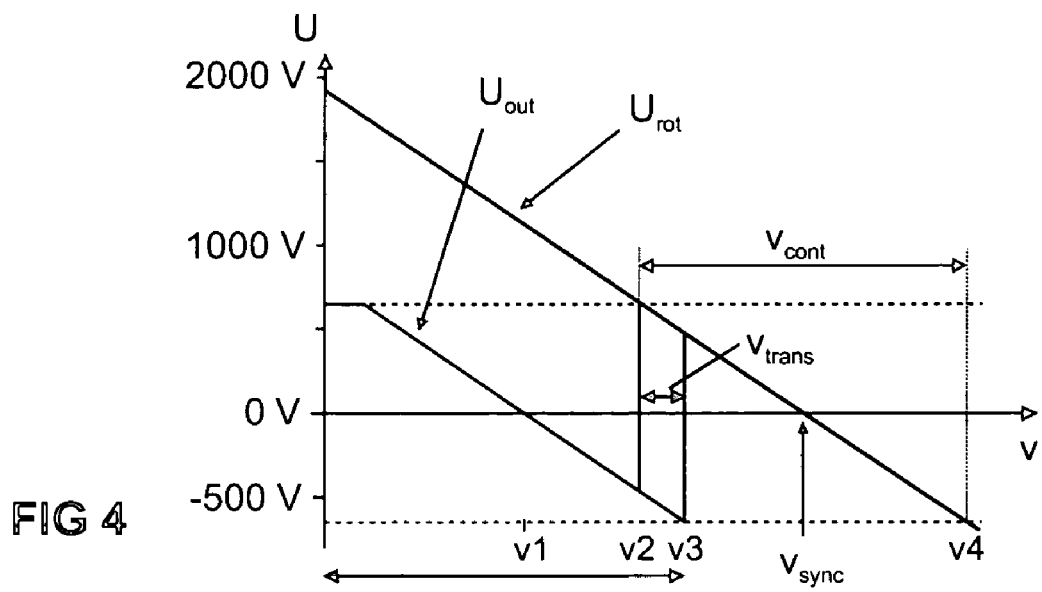
Figure 5:
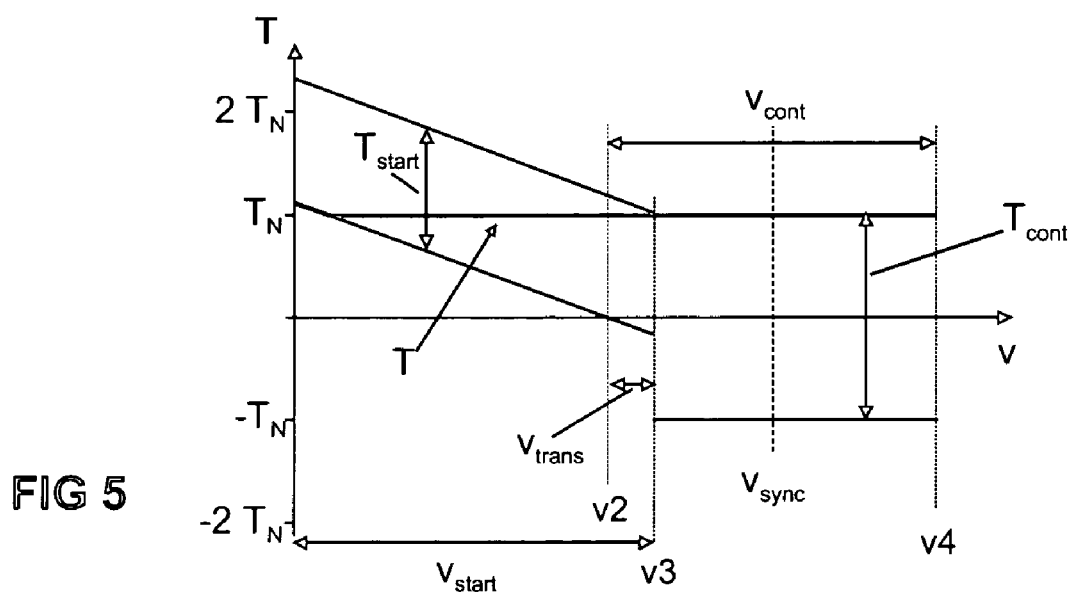

In the following, the starting method will be described by referring to the arrangement of the embodiment of FIG. 3 and to FIGS. 4 and 5 showing curve shapes and some limit values during a start-up.

A start-up of a slip-ring machine is started with all coupling elements 43, 44 of FIG. 3 opened. When a voltage is coupled to an input 27, a DC intermediate circuit 25 is charged. Next, a switch element 44 of a stator is closed and current starts to flow in the machine. An inverter unit 23 of a frequency converter is used for controlling the magnitude of the current of a rotor. During a start-up, the magnitude of the rotor current may be kept e.g. constant and at a rated value, in which case the motor also produces an approximately rated torque.

At first, power is fed from the rotor to an inverter 26 which further feeds it back to a supply network 27. It is to be noted that a rectification part 24 of the frequency converter should be capable of feeding power in both directions, in which case the particular frequency converter type is generally called a network inverter. When the motor 21 accelerates, the voltage induced into the rotor decreases so that the output voltage of the inverter should also be decreased if the current is kept constant.

At a certain speed the output voltage of the inverter is zero. When the motor further accelerates, the inverter is to feed current to the rotor in order to implement a current reference, in which case the direction of power changes. Power is then fed via the rotor to series impedances and the motor.

When the voltage of the inverter unit of the frequency converter approaches its maximum value, the coupling means 43 are short-circuited according to the invention. The inverter unit detects this and adapts its output voltage immediately to a new state in order to maintain the torque and current at a reference magnitude, which is e.g. a rated value of the current, and continues its operation in a normal doubly-fed mode. In connection with short-circuiting the coupling means, the direction of power changes again, and power is fed back to the input through the frequency converter.

When the motor further accelerates, the output voltage of the frequency converter decreases all the way to a synchronous speed. At the synchronous speed the output voltage of the frequency converter is zero. When, after this speed, an oversynchronous range is entered, the output voltage of the frequency converter increases again, and the frequency converter is to feed power to the rotor of the slip-ring machine.

FIG. 4 shows voltages U as a function of a speed v. The figure shows how the voltage of a rotor $U_{rot}$ decreases linearly as the speed increases. In FIG. 4, a start-up situation is assumed wherein the current of the rotor is kept constant. In such a case, the output voltage of a frequency converter $U_{out}$ is to be decreased with respect to the voltage induced into the rotor. At low speeds, however, the ratio is not completely linear due to the resistances of the rotor circuit. FIG. 4 shows how at a speed v1, the output voltage of the frequency converter is zero, further decreasing to a negative one as the speed increases. A negative voltage refers to a voltage vector whose direction has been changed with respect to a positive voltage.

The output voltage of the frequency converter reaches the maximum limit at a speed v3. After this the voltage cannot be further increased but at this point at the latest a transfer to a normal doubly-fed operation is to take place, i.e. the output of the frequency converter is to be coupled directly to the rotor. This transfer can be implemented already earlier, when the speed resides within a transfer range $v_{trans}$ between speeds v2 and v3. When a transfer to a normal use takes place at the speed v2, the output voltage of the frequency converter reaches its maximum limit. If a transfer to a normal use took place prior to reaching the speed v2, the current would be impossible to adjust.

The range between speeds v2 and v4 constitutes a speed adjustment range $v_{cont}$ in the doubly-fed range, and between these speeds resides a synchronous speed $v_{sync}$, at which speed the voltage induced into the rotor is zero. The range between speeds 0 and v3 constitutes a resistor starting range $v_{start}$.

The set of curves in FIG. 5 shows the torque of the motor in connection with the start-up of FIG. 4 wherein the current of the rotor is kept constant and the series impedances 41 are assumed to be resistive. FIG. 5 shows how the torque T also remains at a rated value $T_N$. FIG. 5 also includes limits $T_{start}$ and $T_{cont}$ within which the torque may be adjusted when the speed changes both in connection with a start-up and a normal doubly-fed adjustment. The figure also includes the same symbols of speed as in the case of FIG. 4.

It is obvious to one skilled in the art that the basic idea of the invention may be implemented in many different ways. The invention and its embodiments are thus not restricted to the above-described examples but they may vary within the scope of the claims.

The invention claimed is:

1. An arrangement for starting a slip-ring machine, the arrangement comprising:
   a frequency converter arranged to be connected between a supply network and a rotor of slip-ring machine for controlling the slip-ring machine, and
   starting means for starting the slip-ring machine, wherein the starting means are arranged between the frequency converter and the rotor of the slip-ring machine, whereby the frequency converter is arranged to control the magnitude of the current of the rotor of the slip-ring machine in connection with starting the slip-ring machine, wherein said starting means comprise:
   a three-phase auto-transformer, first ends of primary windings thereof being coupled to phase outputs of the frequency converter and second ends of the primary windings thereof being coupled to a common star point and tapping points of a secondary winding being coupled to a three-phase rotor circuit of the slip-ring machine, and
   first coupling means for connecting the first ends of the primary windings of the auto-transformer to first ends of the secondary windings, and second coupling means for separating phases of the auto-transformer from the common star point.

2. An arrangement as claimed in claim 1, wherein the starting means comprise phase-specific resistive-inductive components arranged between output phases of the frequency converter and phases of the rotor of the slip-ring machine, and coupling means arranged to short-circuit the phase-converter directly to the rotor of the slip-ring machine.

3. An arrangement as claimed in claim 1, wherein the coupling means of the starting means are three-phase switches.

4. A method of starting a slip-ring machine, whereby in connection with the slip-ring machine are arranged
   a frequency converter arranged to be connected between a supply network and a rotor of the slip-ring machine for controlling the slip-ring machine, and
   starting means for starting the slip-ring machine, the starting means being arranged between the rotor of the slip-ring machine and the frequency converter, wherein the method comprises the steps of
   feeding a voltage having a substantially constant frequency to a stator of the slip ring machine,
   controlling the magnitude of the current of the rotor reaches a predetermined rotating speed so that the rotor of the slip-ring machine is directly coupled to an output of the frequency converter.

5. A method as claimed in claim 4, wherein the current of the rotor of the slip-ring machine is controlled to be zero prior to short-circuiting the starting means.

* * * * *